United States Patent
Timariu et al.

(10) Patent No.: US 9,414,225 B2
(45) Date of Patent: Aug. 9, 2016

(54) USER EQUIPMENT HAVING WEB REAL TIME COMMUNICATION ARCHITECTURE

(71) Applicant: BROADCOM CORPORATION, Irvine, CA (US)

(72) Inventors: Petrea Timariu, San Diego, CA (US); Florin Baboescu, San Diego, CA (US); Dutt Kalapatapu, Santa Clara, CA (US); Vojislav Vucetic, Holmdel, NJ (US); Kamesh Medapalli, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/336,743

(22) Filed: Jul. 21, 2014

(65) Prior Publication Data

US 2015/0033300 A1    Jan. 29, 2015

Related U.S. Application Data (60) Provisional application No. 61/857,651, filed on Jul. 23, 2013, provisional application No. 61/889,217, filed on Oct. 10, 2013.

(51) Int. Cl.
| | |
|---|---|
| *H04M 1/66* | (2006.01) |
| *H04W 12/06* | (2009.01) |
| *H04L 29/06* | (2006.01) |
| *H04L 12/22* | (2006.01) |
| *H04L 29/12* | (2006.01) |
| *H04L 29/08* | (2006.01) |

(52) U.S. Cl.
CPC ............. *H04W 12/06* (2013.01); *H04L 63/168* (2013.01); *H04L 63/306* (2013.01); *H04L 65/1069* (2013.01); *H04L 61/2514* (2013.01); *H04L 61/2575* (2013.01); *H04L 61/2589* (2013.01); *H04L 65/1016* (2013.01); *H04L 67/02* (2013.01); *H04L 69/08* (2013.01)

(58) Field of Classification Search
CPC .................................................... H04W 12/06
See application file for complete search history.

(56) References Cited

PUBLICATIONS

A Novel Distributed Wireless VoIP Server Based on SIP. Bai et al. IEEE(2007).*
Ericsson Research Blog. Alun, Stephan. Oct. 2012.*
WebRTC Call Between Browser and SIP Phone. Telecom R&D. Dec. 2012.*
Evaluating two approached for browser-based real-time multimeda communications. Davies et al. ACM(2012).*

* cited by examiner

*Primary Examiner* — Venkat Perungavoor
(74) *Attorney, Agent, or Firm* — Sterne, Kessler, Goldstein & Fox P.L.L.C.

(57) ABSTRACT

A communication device configured to provide Web real-time communication (WebRTC) for internet protocol (IP) multimedia services utilizing one or more 3GPP protocols. The communication device can be configured to authenticate communication with one or more clients using one or more IP Multimedia Subsystem (IMS) credentials. The communication device can also be configured to convert communications between WebRTC and 3GPP protocols utilizing Traversal Using Relays around Network Address Translation (TURN) functionality implemented within the communication device.

20 Claims, 9 Drawing Sheets

USER EQUIPMENT HAVING WEB REAL TIME COMMUNICATION ARCHITECTURE

CROSS REFERENCE TO RELATED APPLICATIONS

This patent application claims the benefit of U.S. Provisional Patent Application No. 61/857,651, filed Jul. 23, 2013, entitled "User Equipment Having Web Real Time Communication Architecture," and U.S. Provisional Patent Application No. 61/889,217, filed Oct. 10, 2013, entitled "WebRTC-IMS Multimedia Interworking Solution," each of which is incorporated herein by reference in its entirety.

BACKGROUND

Field

This application relates generally to wireless communications, including communications using a Web Real Time Communication (WebRTC) Architecture.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE standard is developed by the 3rd Generation Partnership Project (3GPP) and described in the 3GPP specifications and International Mobile Telecomunnications-2000 (IMT-2000) standard, all of which are incorporated by reference in their entirety. Further, 3GPP refers to a communication network as a UTRAN (Universal Mobile Telecommunication System (UMTS) Terrestrial Radio Access Network, a E-UTRAN (Evolved UTRAN), and/or a GERAN (Global System for Mobile Communications (GSM) Enhanced Data rates for GSM Evolution (EDGE) Radio Access Network) to provide some examples. The 3GPP LTE specifications include the European Telecommunications Standard Institute (ETSI) Technical Specification (TS) 136 Series, referred hereinafter as "3GPP TS 36 Series," each of which is incorporated herein by reference in its entirety.

Although exemplary embodiments are described with reference to LTE, the more generic terms "mobile device" and "base station" are used herein except where otherwise noted to refer to the LTE terms "User Equipment (UE)" and "eNodeB/eNB," respectively. Further, the embodiments are not limited to implementation in LTE, as other communication standards could be used, as will be understood by those skilled in the arts.

As will be apparent to one of ordinary skill in the relevant art(s) based on the teachings herein, exemplary embodiments are not limited to the LTE standard, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular communication networks and can be used or implemented in other kinds of wireless communication access networks, including (but not limited to) Wireless Local Area Network(s) (WLAN) (IEEE 802.11), Bluetooth (IEEE 802.15.1 and Bluetooth Special Interest Group (SIG)), Near-field Communication (NFC) (ISO/IEC 18092), ZigBee (IEEE 802.15.4), Radio-frequency identification (RFID), and/or infrared communication, to provide some examples. These various standards and/or protocols are each incorporated by reference in their entirety.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

Figure 1:
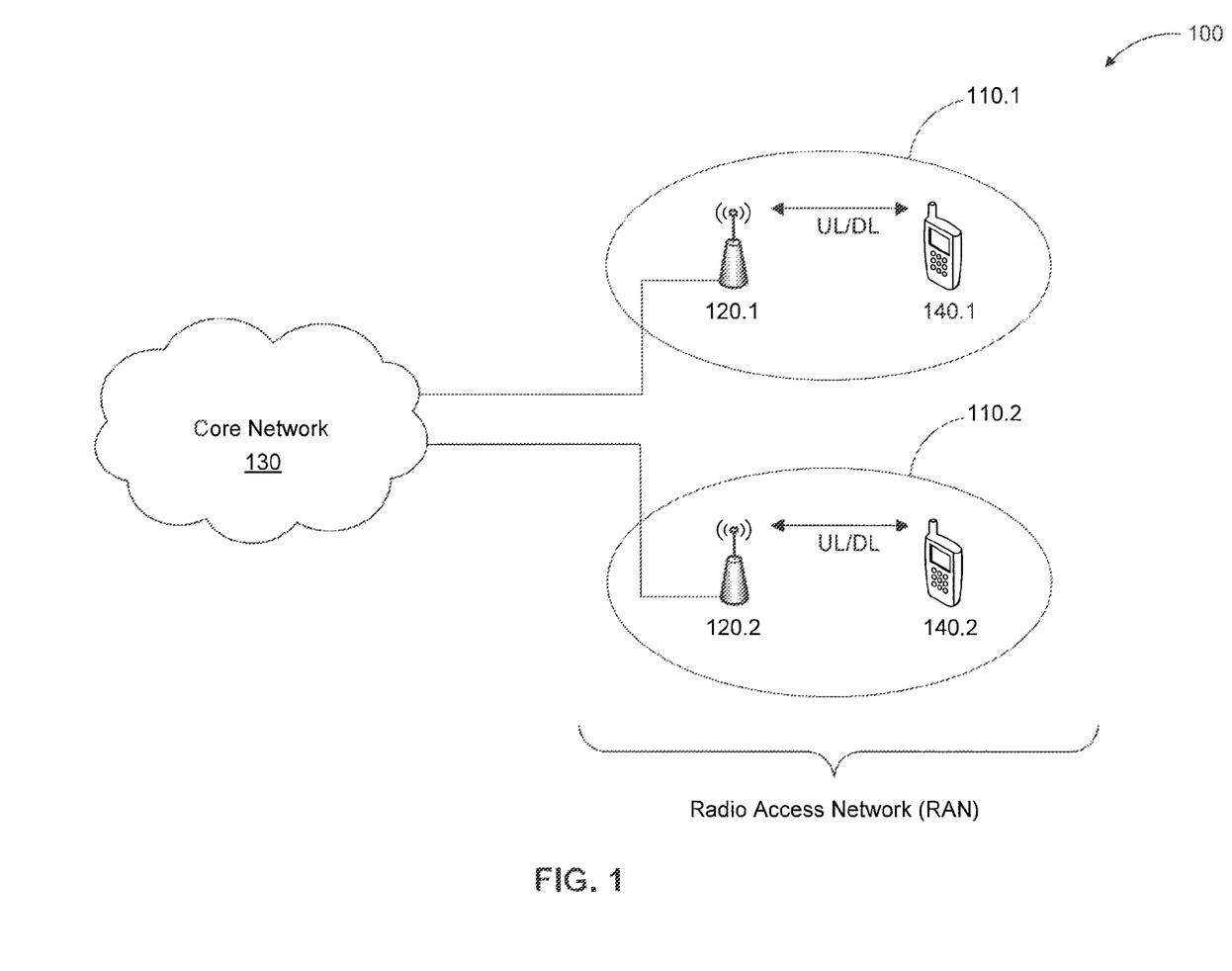
FIG. 1 illustrates an example network environment.

FIG. 1 illustrates an example communication environment 100 that includes a radio access network (RAN) and a core network 130. The RAN includes base stations 120.1 and 120.2, and one or more mobile devices 140. The core network 130 includes one or more well-known communication components such as one or more network switches, one or more network gateways, and/or one or more servers—communicatively coupled to an internet protocol (IP) backhaul network. The number of base stations 120, mobile devices 140, and/or core network components are not limited to the exemplary quantities illustrated in FIG. 1, and the communication environment 100 can include any number of the various components as would be understood by one of ordinary skill in the relevant art(s) without departing from the spirit and scope of the present disclosure.

Examples of the mobile device(s) 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some embodiments, the mobile device 140 may be a stationary device, including, for example, a stationary computing device—such as a personal computer (PC), a desktop computer, a computerized kiosk, and an automotive/aeronautical/maritime in-dash computer terminal.

In an exemplary embodiment, the base station(s) 120 and mobile device(s) 140 each include one or more processors, circuitry, and/or logic that are configured to communicate via one or more wireless technologies, and the mobile device(s) 140 are further configured to support co-existing wireless communications. One or more of the mobile devices 140 can include, for example, a transceiver having one or more processors, circuitry, and/or logic that are configured to transmit and/or receive wireless communications via one or more wireless technologies within the communication environment 100. One or more of the base stations 120 can include one or more processors, circuitry, and/or logic that are configured to: (1) receive one or more wired communications via one or more well-known wired technologies from one or more components of the core network and/or from one or more other base stations 120, and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies to one or more components of the core network and/or to one or more other base stations 120, and (3) to transmit and/or receive wireless communications via one or more wireless technologies within the communication environment 100. The wireless technologies can include one or more of the wireless protocols discussed above. The one or more processors can include (and be configured to access) one or more internal and/or external memories that store instructions and/or code that, when executed by the processor(s), cause the processor(s) to perform one or more operations to facilitate communications via one or more wireless and/or wired team ologies as discussed herein.

In an exemplary embodiment, the mobile device 140.1 can be configured to communicate with the base station 120.1 in a serving cell or sector 110.1 of the communication environment 100. For example, the mobile device 140.1 receives signals on one or more downlink (DL) channels from the base station 120.1, and transmits signals to the base station 120.1 on one or more respective uplink (UL) channels. Similarly, the mobile device 140.2 can be configured to communicate with the base station 120.2 in a serving cell or sector 110.2 of the communication environment 100.

In exemplary embodiments, one or more of the mobile devices 140 can be configured to communicate with one or more other mobile devices 140 utilizing the WebRTC protocol. The communications can be via the core network 130 and/or via a common base station 120 supporting two or more mobile devices 140. For example, the mobile device 140.1 can be configured to establish an IP multimedia session utilizing the WebRTC protocol with the mobile device 140.2 via the respective base stations 120.1 and 120.2 and the core network 130. In exemplary embodiments, the mobile device(s) 140 can be configured to include an IP multimedia Subsystem (IMS) client and a WebRTC client to facilitate a WebRTC-IMS interworking architecture, which is described in more detail in the 3GPP written contribution: S2-133264, "Terminal based WebRTC IMS interworking;" Meeting S2-99, Xiamen, P.R. China; Sep. 23-27, 2013, which is incorporated herein by reference in its entirety.

The core network 130 may be logically divided into circuit switched and packet switched domains with one or more components provided for user traffic and related signaling, and an IP Multimedia Subsystem (IMS) provided for IP multimedia services. For IP multimedia services, functional IMS entities, for example, Call Session Control Function (CSCF) can be provided to handle CSCF related procedures—such as establishing PDP (Packet Data Protocol) context for IMS related signaling, registration and/or one or more other procedures for IMS session management as would be understood by one of ordinary skill in the relevant art(s). In operation, the CSCF can act as Proxy CSCF (P-CSCF) to serve as a first contact point for a mobile device within the IP multimedia subsystem (IMS), as a Serving CSCF (S-CSCF) to handle session states in the network, and/or as an Interrogating CSCF (I-CSCF) to serve as a contact point within a network for IMS connections destined to, for example, a subscriber of that network and/or a roaming subscriber in a given service area. The IP multimedia subsystem (IMS) is discussed in detail in one or more 3GPP Technical Specifications (TS)—such as TS 23.228, "IP Multimedia Subsystem (IMS)," TS 23.229, "IP multimedia call control protocol based on Session Initiation Protocol (SIP) and Session Description Protocol (SDP)," and/or one or more other technical specifications found in the TS 23 Series (referred hereinafter as "3GPP TS 23 Series"), each of which is incorporated herein by reference in its entirety.

An IMS provides user-to-user (i.e., client-to-client) and user-to-content (i.e., client-to-server) communications over IP-based network(s). In operation, the IMS utilizes Session Initiation Protocol (SIP) to establish and control calls and/or sessions between two or more mobile devices (or between mobile device(s) and web server(s)). The Session Description Protocol (SDP), carried by SIP signaling, can be utilized to describe and negotiate media components of a session. In an exemplary embodiment of the present disclosure, the IMS utilizes the Web real-time communication (WebRTC) protocol for IP multimedia services. The WebRTC protocol is defined by the World Wide Web Consortium (W3C) in "WebRTC 1.0: Real-time Communication Between Browsers," and by the Internet Engineering Task Force (IETF) in one or more "Real-Time Communication in WEB-browsers" Working Group (WG) documents, and/or related Requests for Comment (RFC), each of which is incorporated herein by reference in its entirety.

The WebRTC protocol, which is also known as "RTCWeb," enables a web browser to provide real-time communication (RTC) capabilities using one or more JavaScript (JS) application programming interfaces (APIs). In operation, the JavaScript APIs can be implemented so as to not require the installation of additional software and/or services, and can provide bidirectional media processing and/or coding technologies for web browsers. In exemplary embodiments utilizing the WebRTC protocol, a media engine can be implemented into the mobile device (e.g., into a browser application running on the mobile device) to manage input/output (I/O) devices—such as keyboards, microphones, cameras, and/or speakers—to facilitate the exchange of audio, video, images, text, and/or other well-known types of data via the communication network (e.g., internet). For example, the WebRTC protocol can be configured to provide a voice and/or a video connection within a web browser without requiring the installation of standalone applications or browser plug-ins, and without requiring the user to leave their current web browsing session and initiate a separate communication session utilizing, for example, a dialer application. The IMS can also utilize one or more others protocols for IP multimedia services—such as Hyper Text Transfer Protocol (HTTP), Real-time Transport Protocol and Real-time Transport Control Protocol (RTP/RTCP), Secure RTP (SRTP), Message Session Relay Protocol (MSRP), and/or one or more other well-known protocols as would be understood by one of ordinary skill in the relevant art(s).

In an exemplary embodiment, the base stations 120 include one or more processors, circuitry, and/or logic that are configured for communications conforming to 3GPP's Long-Term Evolution (LTE) specification (e.g., the base stations are LTE base stations), and the mobile device 140 includes one or more processors, circuitry, and/or logic that is configured for communications conforming to 3GPP's LTE specification. Those skilled in the relevant art(s) will understand that the base station(s) 120 and the mobile device(s) 140 are not limited to the exemplary 3GPP and non-3GPP wireless protocols discussed herein, and the base station(s) 120 and/or the mobile device(s) 140 can be configured for wireless communications conforming to one or more other 3GPP and/or non-3GPP wireless protocols in addition to, or in the alternative to, the wireless protocols discussed herein.

Figure 2:
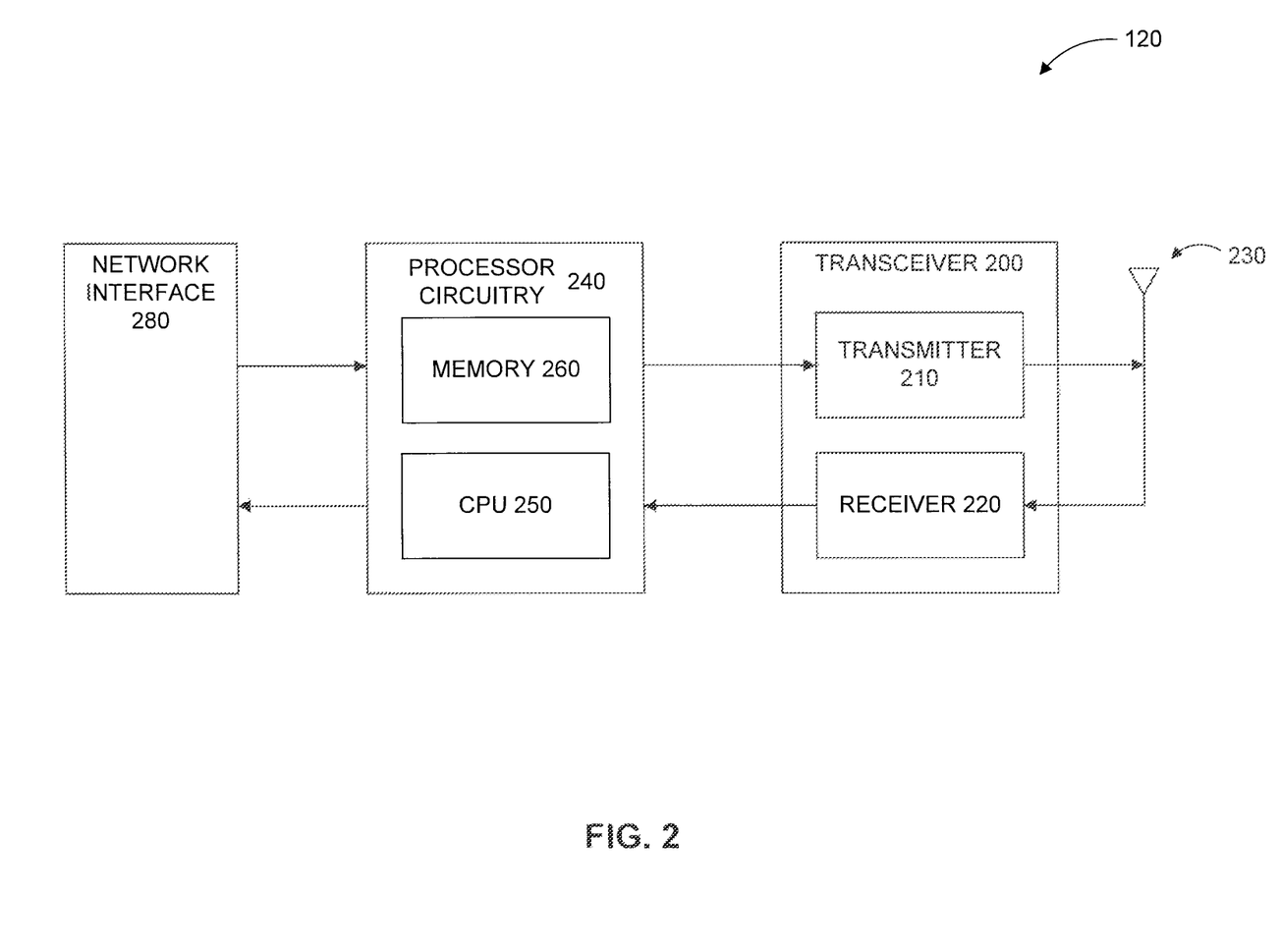
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 and a network interface 280, each communicatively coupled to processor circuitry 240.

The transceiver 200 includes one or more processors, circuitry, and/or logic that are configured to transmit and/or receive wireless communications via one or more wireless technologies within the communication environment 100. In particular, the transceiver 200 can include a transmitter 210 and a receiver 220 that have one or more processors, circuitry, and/or logic configured to transmit and receive wireless communications, respectively, via one or more antennas 230. Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary embodiment, the transceiver 200 is configured for wireless communications conforming to one or more wireless protocols defined by 3GPP. For example, the transceiver 200 is configured for wireless communications conforming to 3GPP's LTE specification. In this example, the transceiver 200 can be referred to as LTE transceiver 200.

Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in embodiments where the transceiver 200 is configured for such other communications conforming to the other 3GPP and/or non-3GPP protocols.

The network interface 280 includes one or more processors, circuitry, and/or logic that are configured to transmit and/or receive communications via one or more wired technologies to/from the core network 130. Those skilled in the relevant art(s) will recognize that the network interface 280 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The processor circuitry 240 can include one or more processors (CPUs) 250 and/or circuits configured to carry out instructions to perform arithmetical, logical, and/or input/output (I/O) operations of the base station 120 and/or one or more components of the base station 120. The processor circuitry 240 can further include a memory 260 that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
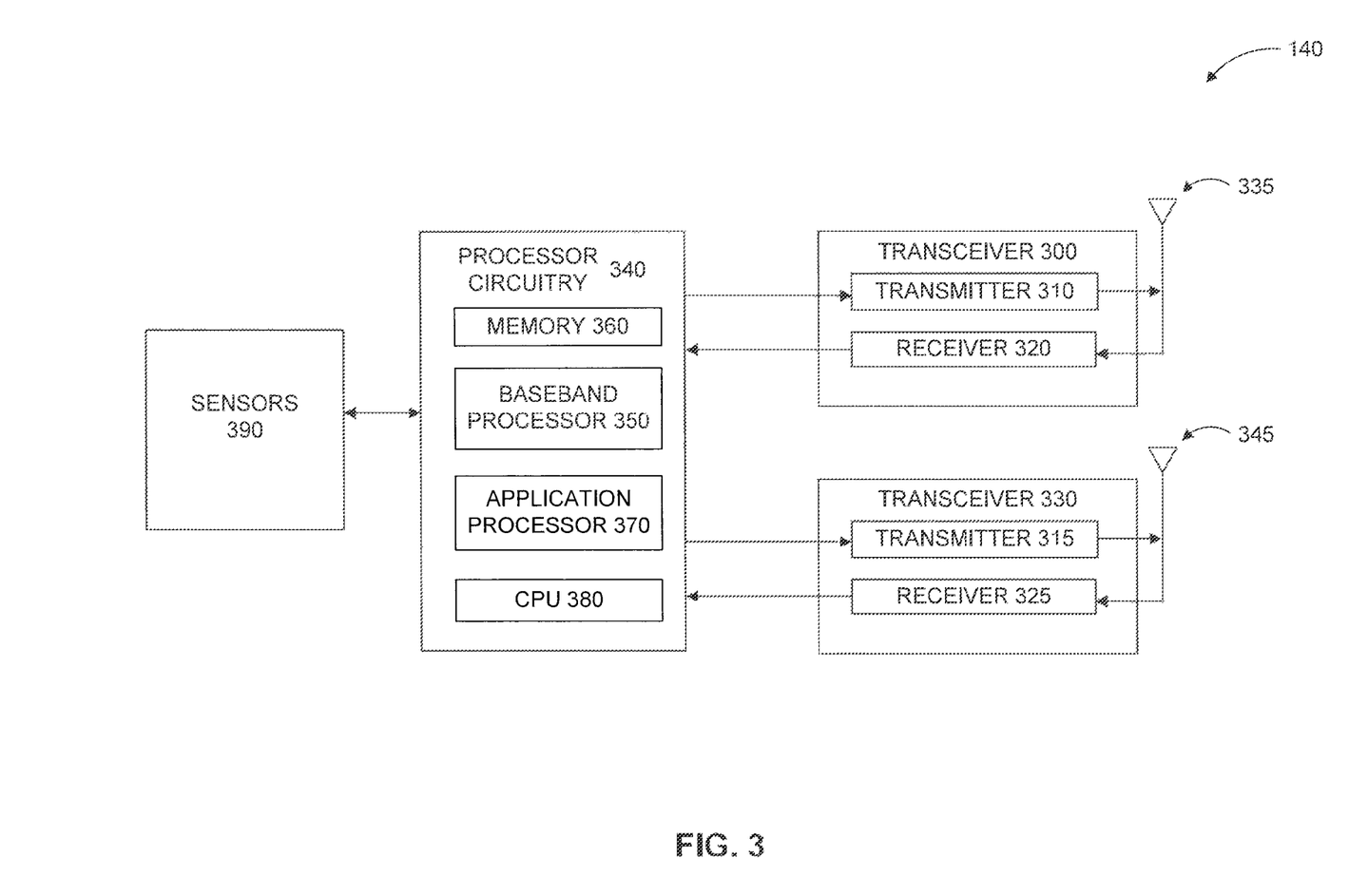
FIG. 3 illustrates a mobile device according to an exemplary embodiment of the present disclosure.

FIG. 3 illustrates the mobile device 140 according to an exemplary embodiment of the present disclosure. The mobile device 140 can include processor circuitry 340 communicatively coupled to one or more transceivers configured to communicate with one or more 3GPP and/or non-3GPP communication protocols. That is, the mobile device 140 can be configured for wireless communications conforming to one or more wireless protocols defined by 3GPP and/or one or more non-3GPP wireless protocols. In an exemplary embodiment, the mobile device 140 includes an LTE transceiver 300 and a WLAN transceiver 330. In this example, the mobile device 140 is configured for wireless communication according to 3GPP's LTE specification and for wireless communication according to IEEE's 802.11 WLAN specification. Those skilled in the relevant art(s) will understand that the mobile device 140 is not limited to these exemplary 3GPP and non-3GPP wireless protocols, and the mobile device 140 can be configured for wireless communications conforming to one or more other 3GPP and/or non-3GPP wireless protocols in addition to, or in the alternative to, the wireless protocols discussed herein, and/or to a subset of the LTE and WLAN specifications discussed above.

The LTE transceiver 300 includes one or more processors, circuitry, and/or logic that are configured for transmitting and/or receiving wireless communications conforming to 3GPP's LTE specification. In particular, the LTE transceiver 300 can include an LTE transmitter 310 and an LTE receiver 320 that have one or more processors, circuitry, and/or logic configured for transmitting and receiving wireless communications conforming to 3GPP's LTE specification, respectively, via one or more antennas 335. Transceiver 300 need not be limited to LTE, and could operate according to one or more other 3GPP and/or non-3GPP protocols, as will be understood by those skilled in art.

The WLAN transceiver 330 includes one or more processors, circuitry, and/or logic that are configured for transmitting and/or receiving wireless communications conforming to IEEE's 802.11 WLAN specification. In particular, the WLAN transceiver 330 can include a WLAN transmitter 315 and a WLAN receiver 325 that have one or more processors, circuitry, and/or logic configured for transmitting and receiving wireless communications conforming to IEEE's 802.11 WLAN specification, respectively, via one or more antennas 345. Transceiver 330 need not be limited to WLAN, and could operate according to one or more other 3GPP and/or non-3GPP protocols, as will be understood by those skilled in art.

In exemplary embodiments, the LTE transceiver 300 and the WLAN transceiver 330 can include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications. Further, those skilled in the relevant art(s) will recognize that antennas 335 and/or 345 may include an integer array of antennas, and that the antennas may be capable of both transmitting and receiving wireless communication signals. It will also be understood by those skilled in the relevant art(s) that any combination of the LTE transceiver 300 and WLAN transceiver 330, as well as one or more other transceivers, circuits, and/or processors may be embodied in a single chip and/or die.

The processor circuitry 340 includes one or more processors, circuitry, and/or logic that are configured to control the overall operation of the mobile device 140, including the operation of the LTE transceiver 300 and WLAN transceiver 330. The one or more processors can include one or more baseband processors 350, one or more application processors 370, and/or one or more other processors (CPUs) 380. As would be understood by those skilled in the relevant arts, any combination of the baseband processor(s) 350, application processor(s) 370 and/or processor(s) 380 may be embodied as a single chip and/or die.

The processor circuitry 340 can further include a memory 360 that stores data and/or instructions, where when the instructions are executed by the baseband processor(s) 350, application processor(s) 370, and/or CPUs 380, perform the functions described herein. The memory 360 can be any well-known volatile and/or non-volatile memory, and can be non-removable, removable, or a combination of both.

The baseband processor(s) 350 can be configured to control the operation of the LTE transceiver 300 and/or WLAN transceiver 330, including transmitting and/or receiving of wireless communications via the LTE transceiver 300 and/or WLAN transceiver 330, and/or perform one or more baseband processing functions, including (but not limited to), for example, media access control (MAC), encoding/decoding, modulation/demodulation, data symbol mapping, error correction, and the like.

The application processor(s) 370 can be configured to carry out instructions to perform arithmetical, logical, and/or input/output (I/O) operations of the mobile device 140 and/or of one or more components of the mobile device 140. For example, the application processor(s) 370 can be configured to carry out internally-stored instructions and/or instructions stored in memory 360, including the running of one or more applications and/or operating systems, which can include user applications. In an exemplary embodiment, the application processor(s) 370 can be configured to run one or more web browser applications, one or more WebRTC applications, and/or one or more JavaScript applications to provide IP multimedia services on the mobile device 140 that utilize an IP multimedia subsystem (IMS) and/or WebRTC protocol.

The processor(s) (CPU) 380 can be configured to control the operation of the mobile device 140, such as power management (e.g., battery control and monitoring), display settings, volume control, and/or user interactions via one or more user interfaces.

In an exemplary embodiment, the mobile device 140 includes one or more other transceivers (not shown) configured to communicate via one or more 3GPP protocols, one or more non-3GPP protocols, and/or one or more other well-known communication technologies. In an exemplary embodiment, the one or more other transceivers can be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples. Further, the mobile device 140 can include one or more positional and/or movement sensors 390 (e.g., GPS, accelerometer, gyroscope sensor, etc.) implemented in (and/or in communication with) the mobile device 140. Here, the location and/or movement of the mobile device 140 can be determined using one or more transceivers configured for navigation purposes, one or more of the positional and/or movement sensors 290, and/or one or more positional determinations using signal characteristics relative to one or more base stations and/or access points.

As set forth in one or more of the 3GPP TS 36 Series specifications, LTE downlink and uplink transmissions are organized into radio frames each having a duration of 10 milliseconds (ms). Here, a radio frame consists of 10 sub-frames, each subframe consisting of two consecutive 0.5 ms slots. Each slot comprises six OFDM symbols for an extended cyclic prefix and seven OFDM symbols for a normal cyclic prefix. In both the uplink and downlink, data is time and frequency multiplexed by mapping OFDM symbols to a time/frequency resource grid consisting of elementary units called resource elements (REs) that are uniquely identified by the antenna port, sub-carrier position, and OFDM symbol index within a radio frame. A group of resource elements corresponding to twelve consecutive subcarriers within a single time slot (e.g., 0.5 ms) is referred to as a resource block (RB). Further, as set forth in one or more of the 3GPP TS 36 Series specifications, an evolved packet system (EPS) bearer is a set of network parameters that define one or more data-specific treatments and/or services, for example, related to traffic flow and/or packets. The EPS bearer can be, for example, a default bearer that offers best effort service, or a dedicated bearer that defines a tunnel for one or more types of traffic that requires better quality of service than that provided by the default bearer. In operation, the EPS bearer is associated with one or more resource elements (REs) of the time/frequency resource grid.

Figure 4:
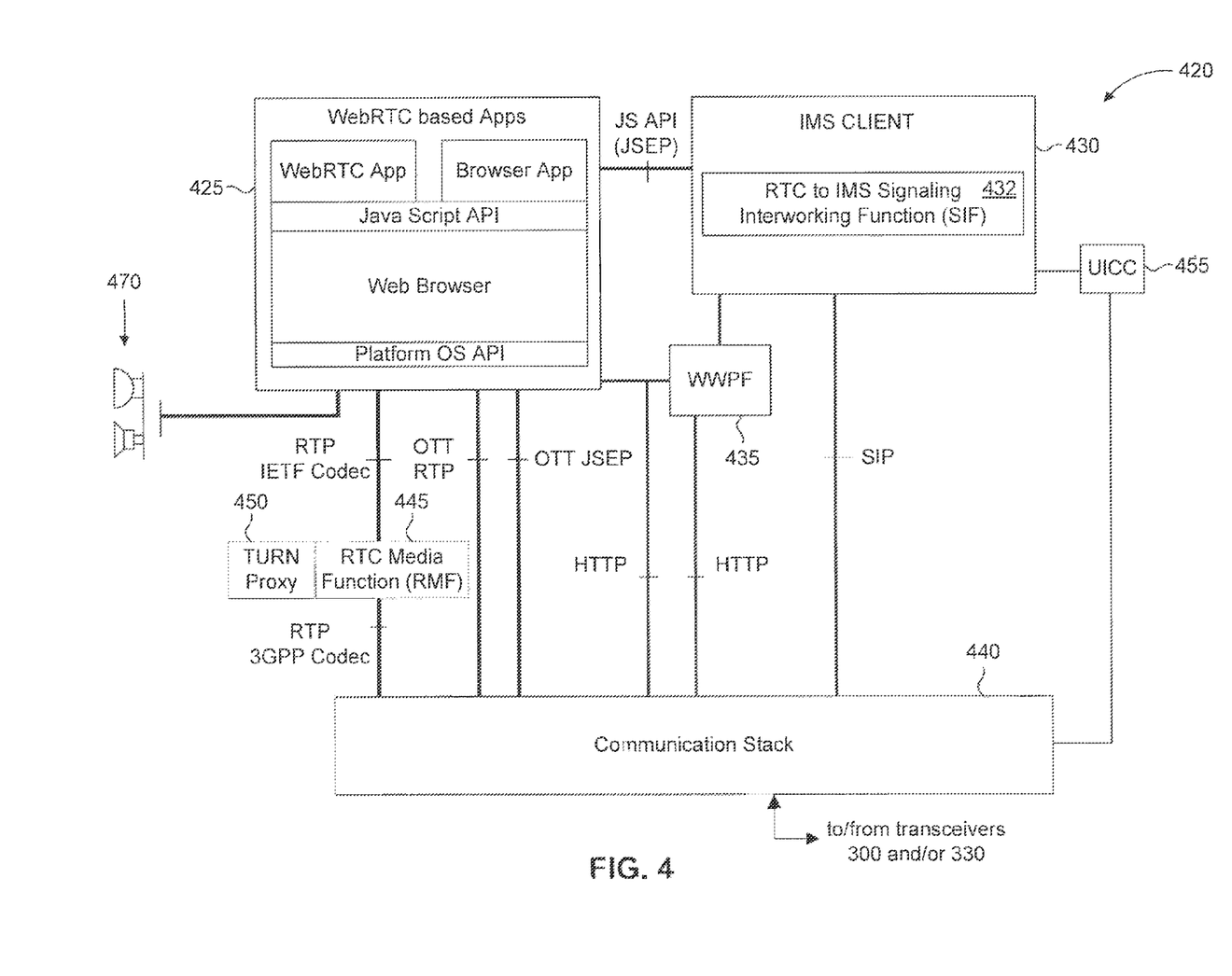
FIG. 4 illustrates mobile device according to an exemplary embodiment of the present disclosure.

FIG. 4 illustrates a mobile device 420 according to an exemplary embodiment of the present disclosure. In an exemplary embodiment, the mobile device 420 can be implemented as, for example, mobile device(s) 120 illustrated in FIGS. 1 and 3.

Mobile device 420 includes a web browser 425, an IP multimedia subsystem (IMS) client 430, WebRTC Web Proxy function (WWPF) 435, communication stack 440, Real Time Communication (RTC) Media Function 445, Traversal Using Relays around Network Address Translation (TURN) proxy 450, and Universal Integrated Circuit Card (UICC) 455. The mobile device 420 can also include one of more input/output (I/O) devices 470 communicatively coupled to the web browser 450, including for example a speaker, a microphone, or a keyboard for receiving user commands.

In an exemplary embodiment, the processor circuitry 340 can be configured to execute one or more operations of one or more of the components of the mobile device 420—such as the web browser 425, IMS client 430, WWPF 435, RTC media function 445, TURN proxy 450, and/or communication stack 440—based on instructions "hard-coded" in the baseband processor(s) 350, application processor(s) 370, and/or CPUs 380, and/or to access memory 360 to retrieve instructions stored in the memory 360, which when executed by the baseband processor(s) 350, application processor(s) 370, and/or CPUs 380, perform the functions associated with the corresponding components of the mobile device 420.

The web browser 425 can include circuitry, logic, and/or code that are configured to retrieve, present, and/or traverse information resources on the World Wide Web (WWW), local area network(s), file and/or operating system(s), etc. Here, an information resource is identified by a Uniform Resource Identifier/Link (URI/URL) and may be, for example, an identifier—such as a web page, an email address, a phone number, a shortcut, a folder destination, a file destination, and/or other identifier as would be understood by those skilled in the relevant arts. The information resource may also be a piece of content—such as an image, a video, a text document, a sound file, and/or other types of content as would be understood by those skilled in the relevant arts. Further, the information resources may include hyperlinks that facilitate navigation to the corresponding resource.

The web browser 425 can be configured to interact with an input/output device (e.g., I/O device 470) to receive input from a user or to output multimedia content (e.g., text, video, images, audio, etc.) to the user.

In an exemplary embodiment, the web browser 425 can include one or more WebRTC applications, one or more browser applications, one or more JavaScript application programming interfaces (APIs), and/or one or more operating system (OS) APIs. In operation, the web browser 425 can be configured to run one or more WebRTC applications to perform one or more IP multimedia services utilizing the WebRTC protocol. Similarly, the web browser 425 can be configured to run one or more browser applications to retrieve, present, and/or traverse information resources on, for example, the World Wide Web.

The IP multimedia subsystem (IMS) client 430 can include circuitry, logic, and/or code that are configured to facilitate communications between the web browser 425 and the communication stack 440 to perform one or more IP multimedia services. In an exemplary embodiment, the IMS client 430 can be configured to convert browser-compatible communications to IMS compatible-communications received from the web browser and/or convert IMS compatible-communications received from the communication stack 440 to browser-compatible communications. For example, the IMS client 430 can be configured to convert, for example, JavaScript session establishment protocol (JSEP) communications received from the web browser 425 to, for example, Rich Communication Services (RCS; also known as "Rich Communication Suite") protocol communications and/or Session Initiation Protocol (SIP) communications, and vice versa.

In an exemplary embodiment, the IMS client 430 is communicatively coupled to the Universal Integrated Circuit Card (UICC) 455 and configured to obtain IP multimedia subsystem (IMS) credentials from the UICC 455 to facilitate communications via the communication stack 440. The IMS credentials can include authentication, authorization, and/or accounting information—such as authentication keys, International Mobile Station Equipment Identities (IMEI), International mobile subscribe/=identities (IMSI), media access control (MAC) addresses, IP addresses, phone numbers, email addresses, credit and/or banking account information, usernames, login information, and/or any other identification information as would be understood by one of ordinary skill in the relevant art(s).

In an exemplary embodiment, the IMS client 430 can include a real time communication (RTC)-to-IMS signaling Interworking function (SIF) 432. The RTC-to-SIF 432 can include circuitry, logic, and/or code that are configured to process communications received from the web browser 425 and to provide the received communications to the communications stack 440, and vice versa. In an exemplary embodiment, the communications from/to the RTC-to-SIF 432 can include one or more multimedia session descriptions that specify the transport and/or media configuration information to be used to establish the IP multimedia services. In these examples, the web browser 425 can provide communications including one or more multimedia session descriptions using one or more formats and/or protocols—such as, for example, JavaScript session establishment protocol (JSEP), the Session Initiation Protocol (SIP), and/or Rich Communication Services (RCS) protocol. In embodiments that utilize SIP and/or RCS, the RTC-to-SIF 432 can be configured to pass the communication(s) to the communication stack 440. In embodiments that utilize JSEP, the RTC-to-SIF 422 can be configured to convert the JSEP compatible communication(s) to communications conforming to the SIP and/or RCS protocol, and vice versa.

The WebRTC Web Proxy function (WWPF) 435 can include circuitry, logic, and/or code that is configured to facilitate access to IP multimedia subsystem (IMS) credentials by the web browser 425 to authenticate and/or authorize the web browser 425 for communications with one or more external network destinations—such as, for example, a WebRTC Web Server Function (WWSF), a web server, a web page, a web-based application, etc. The WWPF 435 can also be configured to perform one or more well-known web proxy functions and provide corresponding web proxy services.

In an exemplary operation, the mobile device 420 is configured to access, for example, a WWSF to establish IP multimedia services. In response to a request by the mobile device 420, the WWPF 435 can be configured to obtain IMS credentials from the UICC 455 to facilitate the authentication and/or authorization of the web browser 425 of the mobile device 420 with the WWSF. In these examples, the WWSF can be configured as an external web server, and can be located within the core network 130 or a third-party network. An exemplary operation of the WWPF 435 is discussed in detail with reference to FIGS. 6A and 6B.

The Real Time Communication (RTC) Media Function 445 can be communicatively coupled to the Traversal Using Relays around Network Address Translation (NAT) (TURN) proxy 450, and can include circuitry, logic, and/or code that are configured to process communications received from the web browser 425 and to provide the received communications to the communications stack 440, and vice versa. In these examples, the RTC media function 445 can be configured to convert communications from the web browser 425 conforming to one or more WebRTC and/or Internet Engineering Task Force (IETF) codecs—such as the Opus format and/or the VP8 format—to one or more 3GPP codecs—such as Adaptive Multi-Rate Wideband (AMR-WB) and/or AMR Narrowband (AMR-NB)—compatible with the communication stack 440. The Opus format is described in IETF's RFC 6716 and the VP8 format is described in IETF's RFC 6386, each of which is incorporated herein by reference in its entirety. AMR-WB and AMR-NB are described in one or more 3GPP TS 26 Series documents—such as 3GPP TS 26.090, 3GPP TS 26.071—and in one or more IETF RFC's—such as RFC 4867 and 4281—each of which is incorporated herein by reference in its entirety.

In an exemplary embodiment, the RTC media function 445 can include one or more encoders/decoders configured to provide one or more codecs to encode/decode one or more communications and/or other data. In an exemplary embodiment, the one or more codecs can conform to the WebRTC protocol, one or more protocols defined by the Internet Engineering Task Force (IETF), one or more 3GPP protocols, and/or one or more other protocols and/or standards as would be understood by one of ordinary skill in the relevant art(s). For example, the RTC media function 445 can be configured to decode communications conforming to one or more IETF real-time transport protocols (RTPs) received from the web browser 425 and to encode the decoded communications to one or more 3GPP real-time transport protocols (RTPs) and provide the encoded communications to the communications stack 400, and vice versa.

In an exemplary embodiment, the RTC media function 445 is configured to cooperatively process communications received from the web browser 425 and/or communication stack 440 with the Traversal Using Relays around Network Address Translation (TURN) proxy 450. The TURN proxy 450 can include circuitry, logic, and/or code that are configured to facilitate the relay of communications around a network address translator' (NAT) and/or a firewall utilizing one or more TURN protocols. The TURN protocols are relay extensions to Session Traversal Utilities for NAT (STUN).

In operation, the TURN proxy can be configured to allow one or more clients (e.g., mobile device 420) that are behind a network address translator to receive incoming and/or transmit outing communications over Transmission Control Protocol (TCP) and/or User Datagram Protocol (UDP) connections. For example, TURN proxy 450 can be configured to relay communications for one or more clients behind, for example, a symmetric network address translator (NAT). In exemplary embodiments, a symmetric NAT is a network address translator that is configured to map requests such that each request from the same internal IP address and port to a specific destination IP address and port is mapped to a unique external source IP address and port. That is, a symmetric NAT is configured to utilize a different mapping if the same internal host (having the same source address and port) sends a packet to a different destination IP address and/or port. Further, in some exemplary embodiments, the symmetric NAT can be configured such that only an external host that receives a packet from an internal host can send a packet back. In an exemplary embodiment, the TURN proxy 450 can include circuitry, logic, and/or code that are configured to perform one or more TURN proxy functions using one or more TURN protocols, to perform one or more Session Traversal Utility for NAT (STUN) functions using one or more STUN protocols, or a combination of both. The TURN protocol(s) are defined in IETF's Request for Comments (RFC) 5766 and the STUN protocol(s) are defined in IETF's RFC 5389, each of which is incorporated herein by reference in its entirety. Further, TURN proxy 450 can be configured to utilize Interactive Connectivity Establishment (ICE) as defined in IETF's RFC 5245, which is incorporated herein by reference in its entirety.

Figure 5:
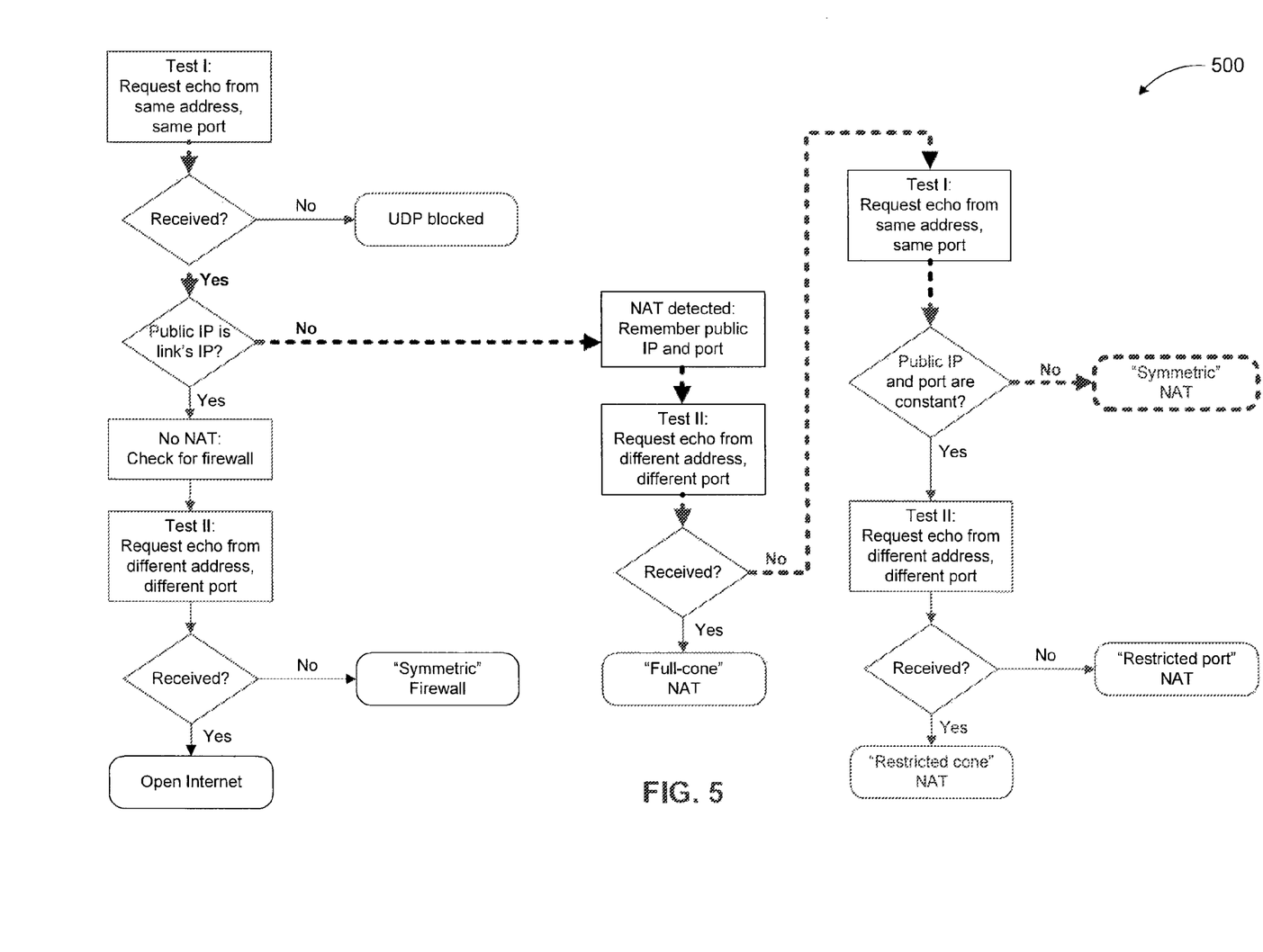
FIG. 5 illustrates a flowchart of a conventional Session Traversal Utilities for Network Address Translation (STUN) algorithm.

FIG. 5 illustrates a flowchart 500 of a conventional Session Traversal Utilities for Network Address Translation (STUN) algorithm. The flowchart 500 of the STUN algorithm can be used to identify the types of network address translator(s) a particular client is behind on a network. That is, the STUN algorithm includes a sequence of network tests that can be employed to identify NAT types based on the outcome of one or more network operations as illustrated in FIG. 5. For example, using the STUN algorithm, a network client (e.g., mobile device 420 and/or one or more mobile devices attempting to connect to the mobile device 420) can perform a sequence of network operations—such as, for example, request an echo from a same IP address and/or same port and determine if it was received, determine if the public IP address is the link's IP address, request an echo from a different address and/or different port and determine if it was received, request an echo from the same IP address but a different port and determine if it was received. Based on the results of the network operations, the mobile device 140 can determine that, for example, a symmetric NAT is being used along the network communication path.

In an exemplary embodiment, the mobile device 420 can be configured to spoof one or more outcomes of the network operations of the STUN algorithm to force the STUN algorithm to return a value indicative of a particular type of NAT. For example, the mobile device 420 can be configured to spoof the outcomes of the STUN algorithm so that the STUN algorithm identifies that a symmetric NAT is being utilized. In this example, because the STUN algorithm identifies a symmetric NAT, the web browser 425 and/or one or more devices communicating with the mobile device 420 can be configured to utilize one or more TURN protocols in the communication operation(s) with a corresponding network client. Further, in utilizing one or more TURN protocols, communications to/from the web browser 425 are cooperatively processed by the RTC media function 445 and the TURN proxy 450. That is, outgoing communications from the web browser 425 conforming to the WebRTC protocol will be converted from one or more IETF real-time transport protocol (RTP) codecs to one or more 3GPP real-time transport protocols (RTP) codecs to be transmitted by the communication stack 440, and vice versa.

The communication stack 440 can include circuitry, logic, and/or code that are configured to process and/or transmit/receive wireless communications conforming to one or more 3GPP and/or non-3GPP protocols. In an exemplary embodiment, communication stack 440 includes one or more modems configured to communicate via one or more 3GPP and/or non-3GPP protocols. For example, the communication stack 440 can be configured to communicate with transceivers 300 and/or 330 to process and/or transmit/receive wireless communications.

Figure 6A:
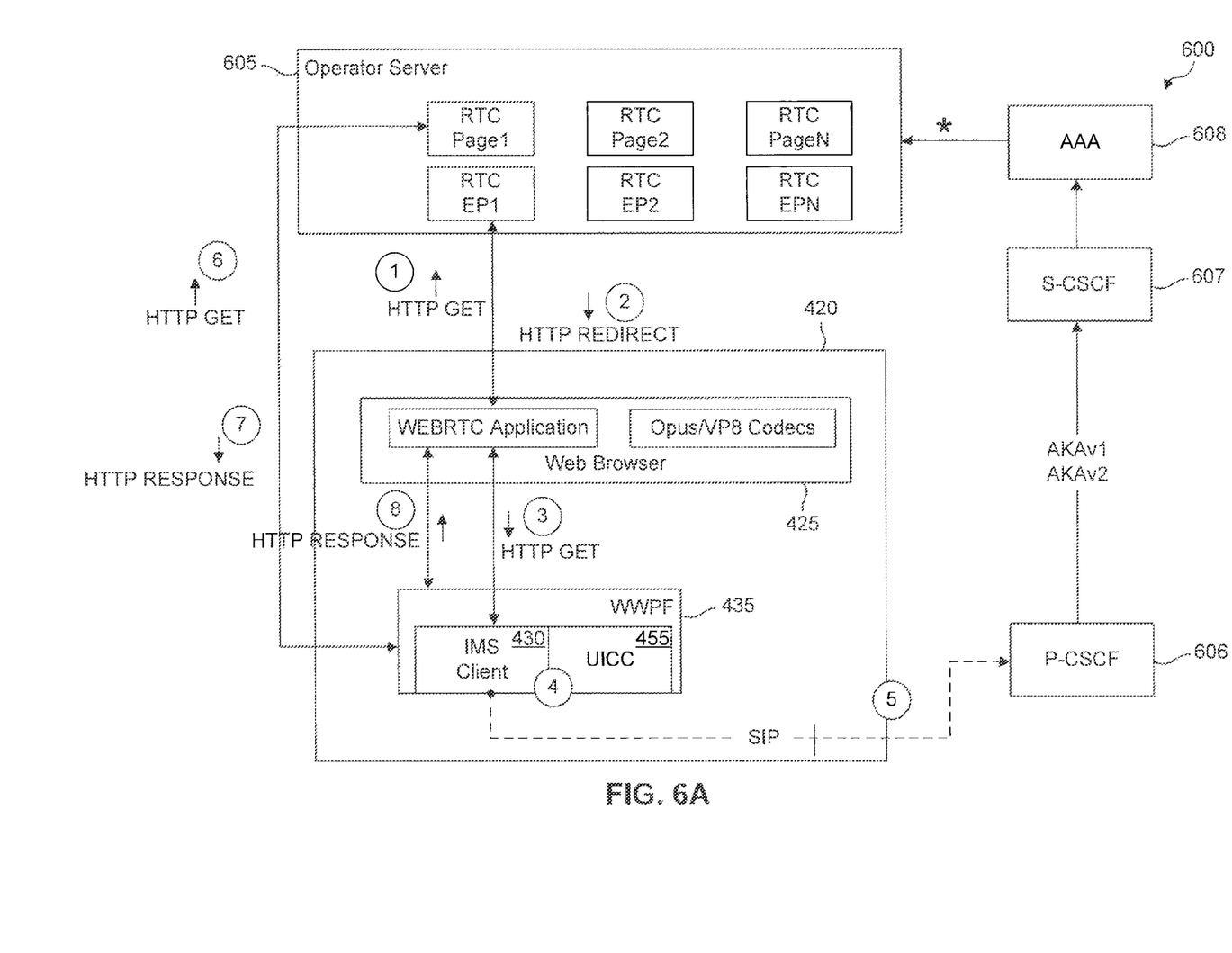
FIG. 6A illustrates a mobile device-to-server architecture according to an exemplary embodiment of the present disclosure.

FIG. 6A illustrates an exemplary embodiment of the mobile device 420 and an exemplary operation of a mobile device-to-server architecture 600 according to an exemplary embodiment of the present disclosure. Discussion of FIG. 6A will be made with reference to FIG. 6B, which illustrates a flowchart 601 of an IMS credential authentication method according to an exemplary embodiment of the present disclosure.

The operation of the mobile device-to-server architecture 600 and the corresponding method of flowchart 601 are described with continued reference to one or more of FIGS. 1-5. The steps of the operation of the mobile device-to-server architecture 600 and the steps of the corresponding method of flowchart 601 are not limited to the order described below, and the various steps may be performed in a different order. Further, two or more operations of the mobile device-to-server architecture 600 and the corresponding steps of flowchart 601 may be performed simultaneously with each other. The steps 1-8 in FIG. 6A correspond to the steps 610-680 of FIG. 6B, respectively. Therefore, discussion of the operation of the mobile device 420 and its interaction with server 605 will be discussed with reference to the flowchart 601 of FIG. 6B and steps 1-8 as illustrated in FIG. 6A.

Figure 6B:
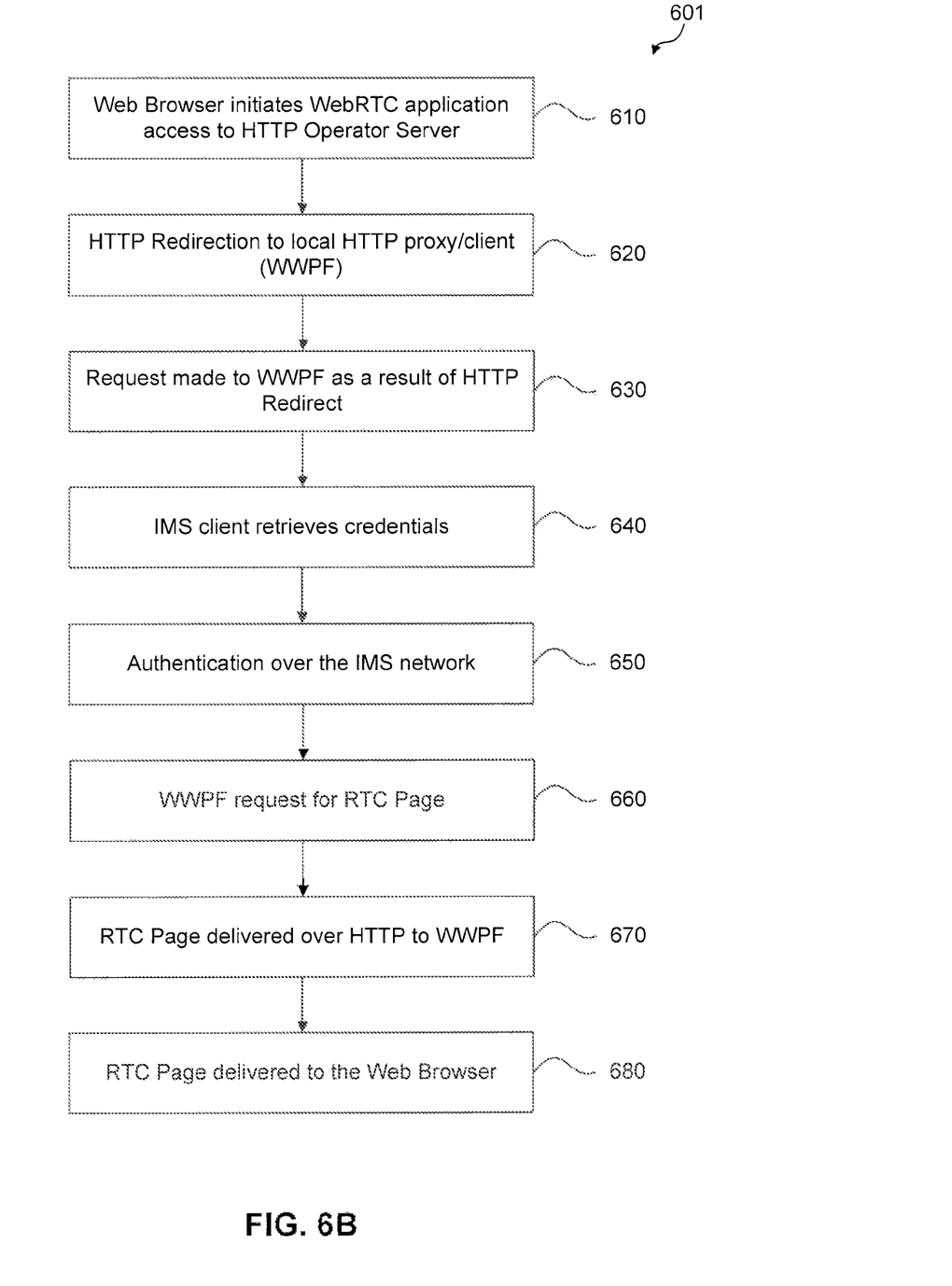
FIG. 6B illustrates a flowchart of an authentication method according to an exemplary embodiment of the present disclosure.

The method of flowchart 601 begins at step 610, where the web browser 425 initiates WebRTC application access to one or more clients, such as, for example, the server 605. In an exemplary embodiment, the web browser 425 generates an HTTP GET command (step 1 in FIG. 6A) and transmits the command to the server 605 to initiate a WebRTC application. In this example, the HTTP GET command can be generated, for example, in response to a user entering a website IP address or domain name into the web browser 425 via one or more I/O devices 470 (e.g., a keyboard).

After step 610, the method of flowchart 601 transitions to step 620, where the server 605 generates an HTTP redirection command (step 2 in FIG. 6A, HTPP REDIRECT) in response to the HTTP GET command, and provides the HTTP redirection command to the web browser 425. In an exemplary embodiment, the HTTP redirection command redirects the website IP address or domain name associated with the HTTP GET command in step 610 to one or more other website IP addresses and/or domain names associated with, for example, a WebRTC application. For example, the HTTP redirection initiates a webpage configured to support one or more IP multimedia sessions utilizing the WebRTC protocol—such as, for example, a remote desktop connection, voice calling, video chat, and/or peer-to-peer file sharing.

After step 620, the method of flowchart 601 transitions to step 630, where the web browser 425 generates a request (HTTP GET command in step 3 of FIG. 6A) for authentication in response to, for example, the HTTP redirection command generated in step 620. The web browser 425 then provides the authentication request to the WWPF 435. In an exemplary embodiment, the HTTP GET command is provided to the WWPF 435 to instruct the WWPF 435 to obtain authentication for the establishment of the IP multimedia session(s).

After step 630, the method of flowchart 601 transitions to step 640, where the WWPF 435 instructs the IMS client 430 to retrieve IMS credentials from the UICC 455 (step 4 in FIG. 6A) in response to the authentication request to establish IP multimedia services using the WebRTC protocol. In an exemplary embodiment, the WWPF 435 instructs the IMS client 430 to retrieve IMS credentials in response to the HTTP GET command generated in step 630. In operation, the WWPF 435 obtains IMS credentials to, for example, authenticate the web browser 425 to establish a secure IP multimedia session utilizing the WebRTC protocol.

After step 640, the method of flowchart 601 transitions to step 650, where the IMS client 430, in cooperation with the UICC 455, preforms authentication of the web browser 425 over the core network 130 (step 5 in FIG. 6A). In an exemplary embodiment, the WWPF 435 controls the IMS client 430 to perform authentication of the web browser 425. In an exemplary embodiment, the IMS client 430 can communicate (via the communication stack 440) with a proxy Call Session Control Function (P-CSCF) 606 within the core network 130 to establish PDP (Packet Data Protocol) context for IMS related signaling, registration and/or one or more other procedures for IMS sessions as would be understood by one of ordinary skill in the relevant art(s). The P-CSCF 606 then communicates with proxy serving Session Control Function (S-CSCF) 607 within the core network 130 to perform Authentication and Key Agreement (AKA) to configure session states within the core network 130. The S-CSCF 607 then communications with the Authentication/Authorization/Accounting (AAA) server 608 within the core network 130 to access one or more user profiles associated with the IMS credentials and/or one or more authentication keys obtained from the P-CSCF 606 and/or S-CSCF 607. The AAA server 608 can be configured to provide information associated with the one or more user profiles and/or one or more authentication keys to the server 605 to authenticate the web browser 425 with the server 605 using the IMS credentials. In an exemplary embodiment, the authentication of the web browser 425 using one or more components of the core network 130—such as the P-CSCF 606, S-CSCF 607 and AAA server 608—can be performed in the background without additional user input. For example, the authentication can be performed without requiring one or more user-supplied credentials—such as login information and/or one or more passwords. In this example, the authentication can be obtained using, for example, one or more IMS credentials associated with, for example, the user of the mobile device 140 and/or account information associated with the service provider(s) of the core network 130.

After step 650, the method of flowchart 601 transitions to step 660, where the WWPF 435 requests a real-time communication (RTC) session (e.g., an RTC web page) from the server 605 (step 6 in FIG. 6A). In an exemplary embodiment, the WWPF 435 generates an HTTP GET command to request a webpage configured to support one or more IP multimedia sessions utilizing the WebRTC protocol—such as, for example, a remote desktop connection, voice calling, video chat, and/or peer-to-peer file sharing.

After step 660, the method of flowchart 601 transitions to step 670, where the RTC webpage is delivered (step 7 in FIG. 6A, HTTP Response) over Hypertext Transfer Protocol (HTTP) to the WWPF 435 via the communication stack 440. In an exemplary embodiment, the server 605 generates an RTC webpage (i.e., a webpage configured to support one or more IP multimedia sessions utilizing the WebRTC protocol). In an exemplary embodiment, the serve' 605 generates an RTC webpage personalized to one or more user profiles corresponding to the IMS credentials utilized in the authentication of the web browser 425.

After step 670, the method of flowchart 601 transitions to step 680, where the WWPF 425 delivers the RTC web page to the web browser 425 (step 8 in FIG. 6A) to establish an IP multimedia session conforming to the WebRTC protocol. In an exemplary embodiment, the RTC webpage is personalized to one or more user profiles associated one or more users of the mobile device 420.

Figure 7:
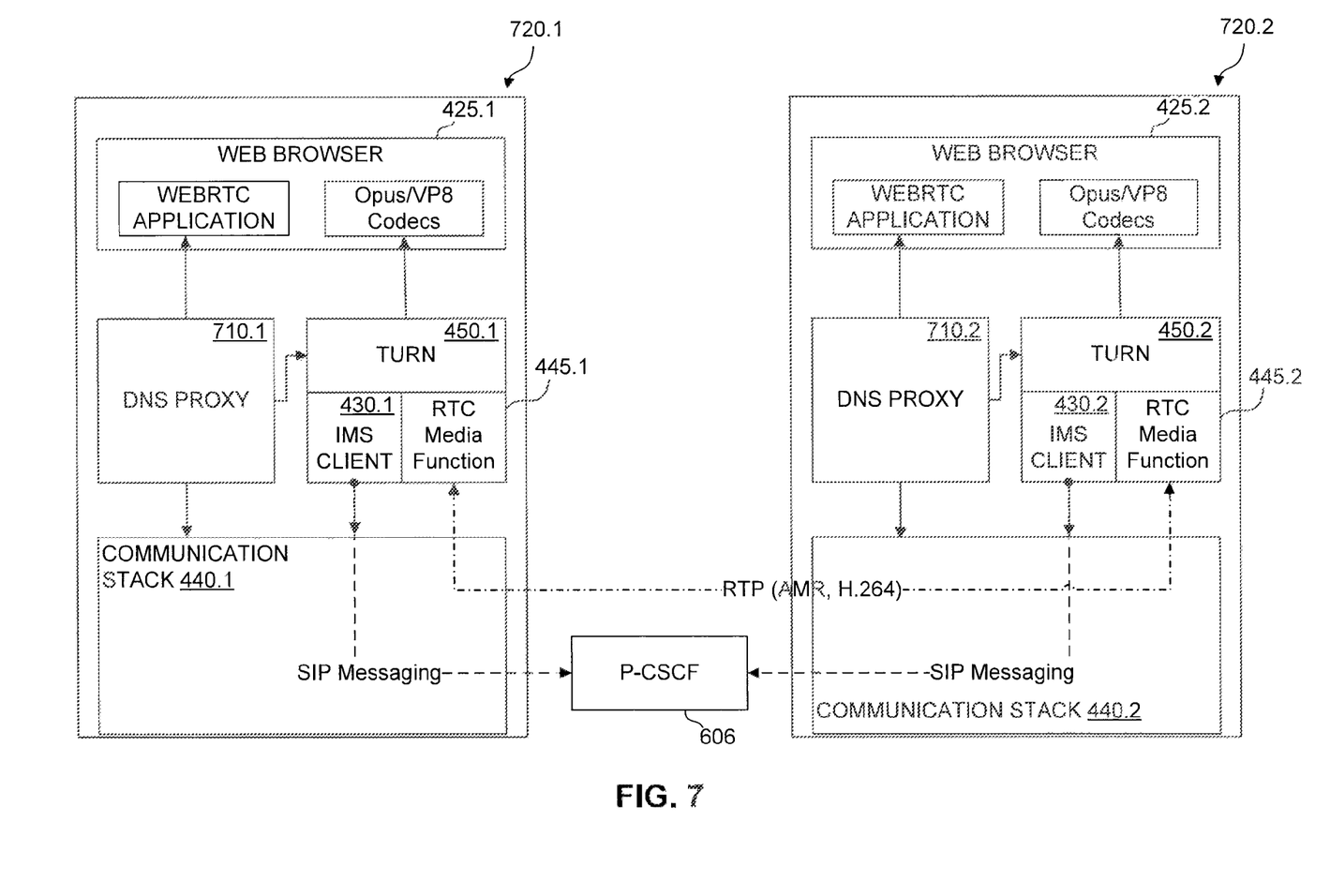
FIG. 7 illustrates a mobile device-to-mobile device architecture according to an exemplary embodiment of the present disclosure.

FIG. 7 illustrates a mobile device-to-mobile device architecture according to an exemplary embodiment of the present disclosure. For example, FIG. 7 illustrates the exchange of communications between two or more clients—such as, for example, mobile devices 720.1 and 720.2—to establish IP multimedia services utilizing the WebRTC protocol.

Mobile device 720.1 and Mobile device 720.2 are exemplary embodiments of the mobile devices 120 in FIG. 1 and/or mobile devices 420 of FIGS. 4 and 6A-6B. As would be understood by those skilled in the relevant arts, mobile devices 720.1 and 720.2 may share similar components and/or functional operations as mobile devices 120 and/or 420. For brevity, further discussion of one or more similar components and/or functional operations may be omitted.

In an exemplary embodiment, mobile device 720.1 includes web browser 425.1, IMS client 430.1, communication stack 440.1, RTC media function 445.1, and TURN proxy 450.1. These components are similar to those discussed above with reference to FIGS. 4-6B; and therefore, discussion of these components is omitted for brevity.

Mobile device 720.1 also includes Domain Name System (DNS) proxy 710.1 that can include circuitry, logic, and/or code that are configured to manage and/or store one or more domain names and corresponding IP address mappings, and to facilitate the assigning of one or more domain names and the mapping of the domain name(s) to corresponding IP addresses. The domain name-IP address mapping can be maintained by one or more internet namespaces and/or domain name hierarchies. In operation, the DNS proxy 710.1 can be configured to cache one or more domain name-IP address maps, and to obtain the mapping of one or more domain names/IP address from one or more internet namespaces and/or domain name hierarchies, Mobile device 720.2 can include common components, of which discussion has been omitted for brevity.

In an exemplary embodiment, the mobile device 720.1 can be configured to establish IP multimedia services with mobile device 720.2 using the WebRTC protocol and the IP multimedia Subsystem (IMS). For example, the mobile device 720.1 can be configured to manipulate (e.g., spoof) one or more outcomes of the network operations of the STUN algorithm as described with reference to FIG. 5 so that outgoing and/or incoming communications of the web browser 425.1 utilize the TURN proxy 450.1 and/or RTC media function 445.1. In an exemplary embodiment, the mobile device 720.1 (e.g., WWPF 435) can be configured to spoof one or more outcomes of the network operations of the STUN algorithm to result in a symmetric NAT determination. For example, the WWPF 435 can provide an answer and/or response to one or more inquiries of the STUN algorithm in FIG. 5 so that the STUN algorithm will determine a symmetric NAT implementation. In this example, the spoofing of the answer(s) and/or response(s) of the STUN algorithm can result in the symmetric NAT determination regardless of whether one or more symmetric NATs are actually implemented within the core network 130. By spoofing the STUN algorithm to arrive at the symmetric NAT determination, the mobile device 720.1 can be configured to utilize the TURN proxy 450.1, and in turn utilize the RTC media function 445.1 and/or IMS client 430.1, in processing IP multimedia services communications (e.g., WebRTC communications). Further, the mobile device 720.1 can utilize Interactive Connectivity Establishment (ICE) as defined in IETF's RFC 5245 to facilitate the establishment of a communication link with the mobile device 720.2.

In operation, ICE is configured to allow the mobile devices 720.1 and 720.2 to determine one or more IP addresses and/or ports to use (e.g., which IP addresses and/or ports where assigned by one or more NATs on the core network 130) and to instruct the mobile device 720.2 to utilize one or more TURN protocols for communications with the mobile device 720.1. That is, communications associated with the IP multimedia services will utilize the TURN proxy 450.1 and/or RTC media function 445.1 to convert between WebRTC/IETF protocols and 3GPP protocols. For example, communications from web browser 425.1 conforming to the OPUS and/or VP8 codecs can be cooperatively processed by the TURN proxy 450.1, RTC media function 445.1, and IMS client 430.1 to generate communications conforming to one or more 3GPP codecs (e.g., Adaptive Multi-Rate Wideband (AMR-WB)). Upon receipt of such communications, the mobile device 720.2 can be configured to perform inverse processing using its TURN proxy 450.2, RTC media function 445.2, and IMS client 430.2 to provide communications conforming to the OPUS and/or VP8 codecs to its web browser 425.2.

Figure 8:
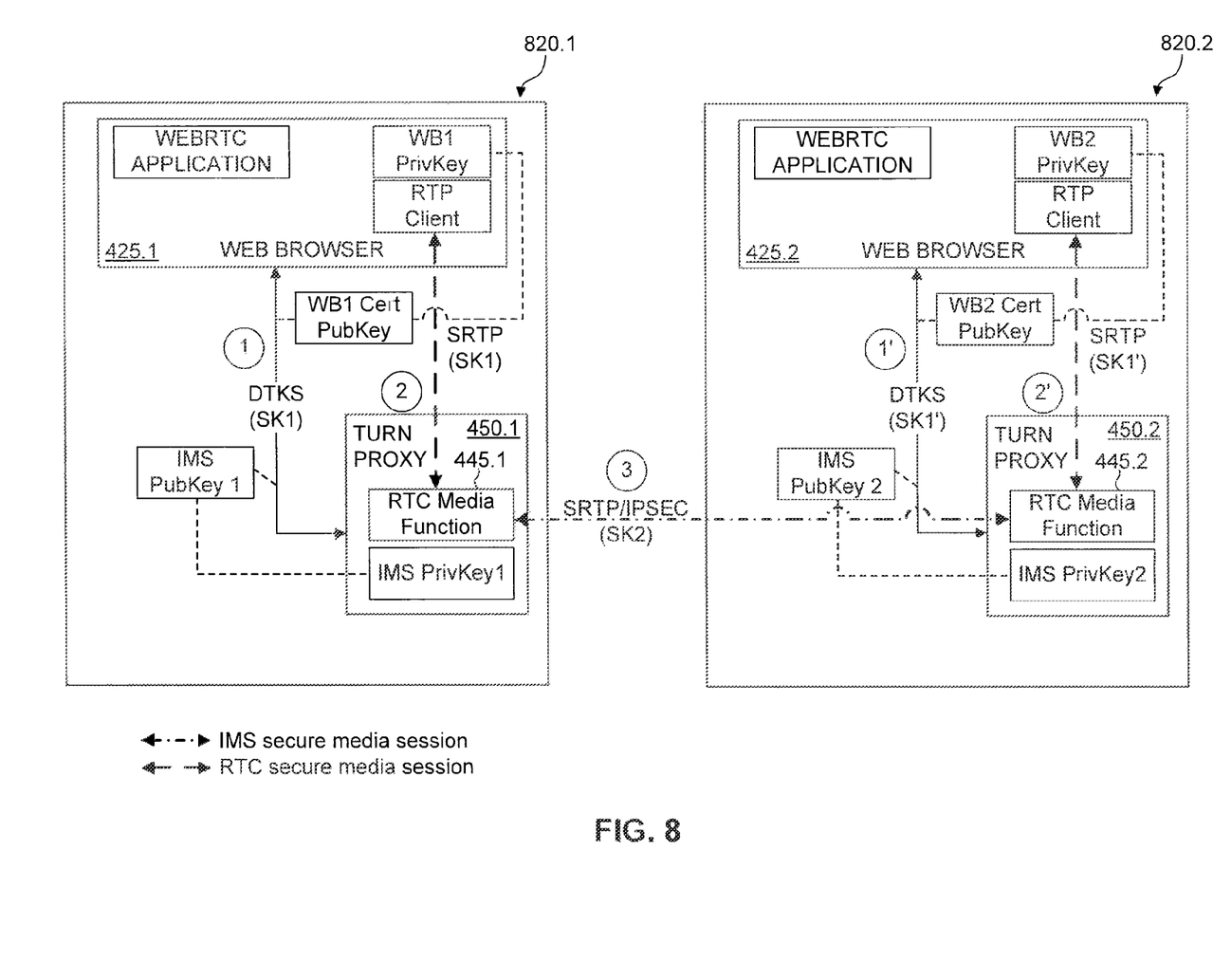
FIG. 8 illustrates a mobile device-to-mobile device architecture according to an exemplary embodiment of the present disclosure.

FIG. 8 illustrates a mobile device-to-mobile device architecture according to an exemplary embodiment of the present disclosure. The exemplary embodiment illustrated in FIG. 8 is described with reference to FIG. 7, and describes the conversion between WebRTC/IETF protocols and 3GPP protocols in an IP multimedia session.

Mobile device 820.1 and Mobile device 720.1 are exemplary embodiments of the mobile devices 120 in FIG. 1, mobile devices 420 of FIGS. 4 and 6A-6B, and/or mobile devices 720 of FIG. 7. As would be understood by those skilled in the relevant arts, mobile devices 820.1 and 820.2 may share similar components and/or functional operations as mobile devices 120, 420, and/or 720. For brevity, further discussion of one or more similar components and/or functional operations may be omitted.

In an exemplary embodiment, the web browser 425.1 is configured to generate communications conforming to the OPUS and/or VP8 codecs. These communication can be encrypted with one or more public and/or private keys (e.g., session key 1 (SK1)) utilizing web browser private key function (WB1 PrivKey) and/or web browser public key function (WB1 PubKey) (step 1 in FIG. 8). The WB1 PrivKey and WB1 PubKey can each include circuitry, logic, and/or code that are configured to generate, manage, and/or process private and public encryption/decryption keys, respectively.

In operation, the TURN proxy 450.1 can be configured to receive the encoded communications from the web browser 425.1 and, in corporation with the RTC media function 445.1, convert the encrypted WebRTC communications to encrypted 3GPP communications. For example, the RTC media function 445.1 can be configured to utilize SK1 provided by the web browser private key function (WB1 PrivKey) and/or web browser public key function (WB1 PubKey) to decrypt the encrypted WebRTC communications. The RTC media function 445.1 can be configured decode the WebRTC communications conforming to the OPUS and/or VP8 codecs and encode the communications to one or more 3GPP codecs (e.g., Adaptive Multi-Rate Wideband (AMR-WB)). The RTC media function 445.1 can be configured to then encrypt the 3GPP compatible communications (e.g., communications conforming to 3GPP codecs) with one or more public and/or private keys (e.g., session key 2 (SK2)) utilizing IMS private key function (IMS PrivKey 1) and/or IMS public key function (IMS PubKey 1) (step 2 in FIG. 8). The encrypted 3GPP communications can then be transmitted to the mobile device 820.2 using one or more secure protocols such as secure real-time transport protocol (SRTP) and/or Internet Protocol Security (IPsec).

Upon receipt of the encrypted 3GPP communications, the mobile device 820.2 can be configured to perform inverse processing by its TURN proxy 450.2 and RTC media function 445.2 using one or more private and public encryption/decryption keys—such as web browser private key function (WB2 PrivKey), web browser public key function (WB2 Pub- Key), IMS private key function (IMS PrivKey 2) and/or IMS public key function (IMS PubKey 2) to provide the web browser 425.2 with communications conforming to the WebRTC protocol (steps 1' and 2').

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

In the prior description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments Whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; or other hardware devices. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Abstract section, is intended to be used to interpret the claims. The Abstract section may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A communication device, comprising:
a transceiver configured to communicate with a network; and
processor circuitry communicatively coupled to the transceiver, the processor circuitry configured to:
generate, using a web browser, a first initiation request to initiate a browser application;
transmit, using the transceiver, the first initiation request to a client on the network;
request, by the web browser from a Web Real Time Communication (WebRTC) web proxy function (WWPF), authentication of the web browser based on a response to the first initiation request;
obtain, by the WWPF, credentials utilized for the authentication of the web browser;
provide, by the WWPF using the transceiver, the credentials to the client to authenticate the web browser with the client;
generate, by the WWPF, a second initiation request to initiate WebRTC application; and
deliver, by the WWPF the WebRTC application to the web browser to establish a WebRTC session with the client based on the authentication of the web browser with the client,
wherein the web browser and the WWPF are implemented on the processor circuitry.

2. The communication device of claim 1, wherein the credentials are internet protocol (IP) multimedia subsystem (IMS) credentials.

3. The communication device of claim 1, wherein the credentials include authentication, authorization, or accounting information associated with the communication device.

4. The communication device of claim 1, wherein the processor circuitry is further configured to obtain, using the transceiver, an authentication key, an encryption key, or a decryption key associated with the communication device.

5. The communication device of claim 1, wherein the processor circuitry is further configured to:

convert WebRTC information associated with the browser application from a WebRTC format to an internet protocol (IP) multimedia subsystem (IMS) format.

6. The communication device of claim 5, wherein the WebRTC information is one or more multimedia session descriptions.

7. The communication device of claim 5, wherein the WebRTC format conforms to the JavaScript session establishment protocol (JSEP).

8. The communication device of claim 5, wherein the IMS format conforms to a Session Initiation Protocol (SIP) or a Rich Communication Services (RCS) protocol.

9. The communication device of claim 1, wherein the processor circuitry is further configured to
convert a communication from the communication device to the client from a WebRTC protocol to a 3rd Generation Partnership Project (3GPP) protocol.

10. A communication device, comprising:
a transceiver configured to communicate with a network; and
processor circuitry communicatively coupled to the transceiver, the processor circuitry configured to:
establish a Web Real Time Communication (WebRTC) session with a client on the network;
generate a WebRTC communication to be sent to the client over the WebRTC session;
spoof an operation of one or more Session Traversal Utilities for Network Address Translation (STUN) functions to identify a Network Address Translation type;
convert the WebRTC communication from a WebRTC format to an internet protocol (IP) multimedia subsystem (IMS) format based on the identified Network Address Translation type; and
transmit, using the transceiver, the converted WebRTC communication to the client.

11. The communication device of claim 10, wherein the processor circuitry is further configured to:
perform a Traversal Using Relays around Network Address Translation (TURN) operation to convert the WebRTC communication to the IMS format based on the identified Network Address Translation type.

12. The communication device of claim 11, wherein the processor circuitry is further configured to:
receive, using the transceiver, a client communication conforming to the IMS format; and
convert the client communication to the WebRTC format using the TURN operation.

13. The communication device of claim 10, wherein the processor circuitry is further configured to
spoof the operation of the one or more STUN functions to identify the Network Address Translation type as a symmetric Network Address Translator.

14. The communication device of claim 10, wherein the WebRTC format is an Opus format or a VP8 format.

15. The communication device of claim 10, wherein the IMS format is an Adaptive Multi-Rate (AMR) Wideband format or an AMR Narrowband format.

16. A tangible computer-readable medium having instructions stored thereon that, when executed by at least one processor, cause the at least one processor to perform operations comprising:
generating, using a web browser, a first initiation request to initiate a browser application;
transmitting, using a transceiver, the first initiation request to a client on a network;
requesting, by the web browser from a Web Real Time Communication (WebRTC) web proxy function (WWPF), authentication of the web browser based on a response to the first initiation request;
obtaining, by the WWPF, credentials utilized for the authentication of the web browser;
providing, by the WWPF using the transceiver, the credentials to the client to authenticate the web browser with the client;
generating, by the WWPF, a second initiation request to initiate a WebRTC application; and
delivering, by the WWPF, the WebRTC application to the web browser to establish a WebRTC session with the client based on the authentication of the web browser with the client.

17. The tangible computer-readable medium of claim 16, the operations further comprising:
generating a WebRTC communication to be sent to the client over the WebRTC session;
converting the WebRTC communication from a WebRTC format to an internet protocol (IP) multimedia subsystem (IMS) format; and
transmitting, using the transceiver, the converted WebRTC communication to the client.

18. The tangible computer-readable medium of claim 17, the operations further comprising:
performing a Traversal Using Relays around Network Address Translation (TURN) operation to convert the WebRTC communication to the IMS format, the performing of the TURN operation being based on one or more Session Traversal Utilities for Network Address Translation (STUN) functions.

19. The communication device of claim 2, wherein the IMS credentials are obtained from a Universal Integrated Circuit Card.

20. The communication device of claim 10, wherein the spoofing of the operation of the one or more STUN functions results in a determined type of Network Address Translation being identified regardless of whether the determined type is actually implemented in the network.

* * * * *